United States Patent [19]

Bronkhorst

[11] 3,805,906
[45] Apr. 23, 1974

[54] MEASURING INSTRUMENT WITH DATA OPTICAL PROJECTION SYSTEM
[75] Inventor: Henri Louis Bronkhorst, Ridderkek, Netherlands
[73] Assignee: Matschappij van Berkel's Patent N.V., Rotterdam, Netherlands
[22] Filed: Aug. 16, 1973
[21] Appl. No.: 388,816

[30] Foreign Application Priority Data
Aug. 24, 1972 Germany............................ 2241591

[52] U.S. Cl. ................................. 177/178, 353/40
[51] Int. Cl. ...................... G01g 23/32, G03b 21/00
[58] Field of Search .......... 177/178; 353/20, 25, 40, 353/41, 84

[56] References Cited
UNITED STATES PATENTS 3,104,273 9/1963 Ballance ........................... 353/20 X
3,146,663 9/1964 Kirkconnell et al. ................. 353/20
3,302,518 2/1967 Six ..................................... 353/41
3,338,131 8/1967 Klein ................................. 353/84 X
3,477,781 11/1968 Six ..................................... 353/41 X
3,556,639 1/1971 Graser, Jr. ...................... 353/20 UX Primary Examiner—George H. Miller, Jr.
Attorney, Agent, or Firm—Lockwood, Dewey, Zickert & Alex

[57] ABSTRACT

A measuring instrument having an optical projection system for projecting data to a readout device and including a translucent data storage device having a plurality of sets of data, one of which is being projected at any given time, wherein the data storage device is movable in response to the magnitude of the measuring function, and a light energy transmitting device coacting with the data storage device to project data from one set of data at any given time.

19 Claims, 12 Drawing Figures

PATENTED APR 23 1974 3,805,906
SHEET 1 OF 3
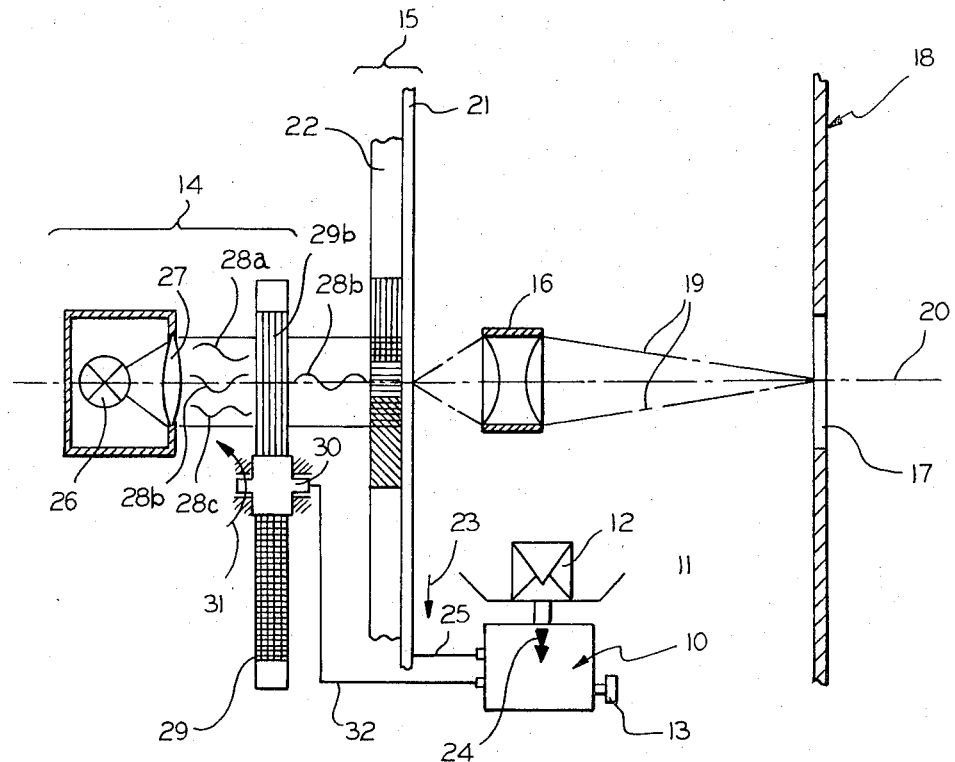
FIG.1
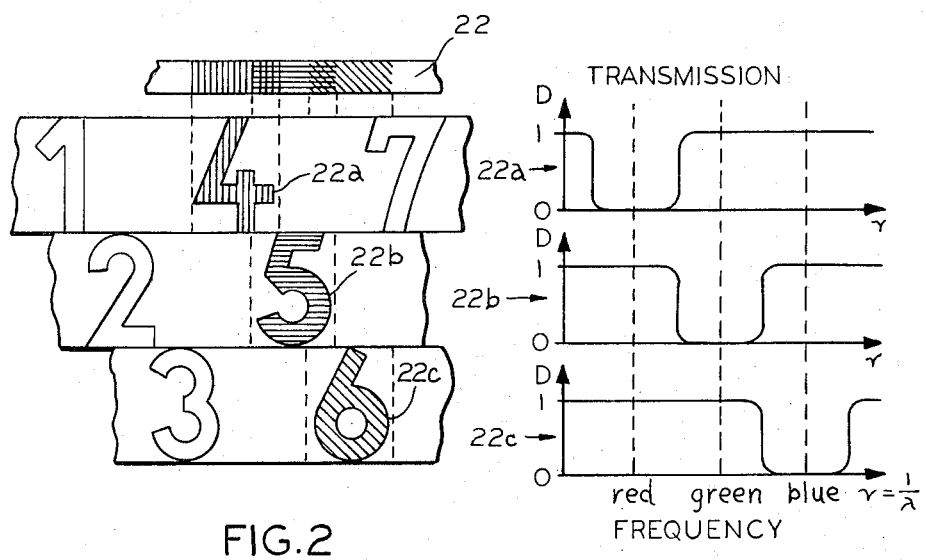
FIG.2
FIG.3

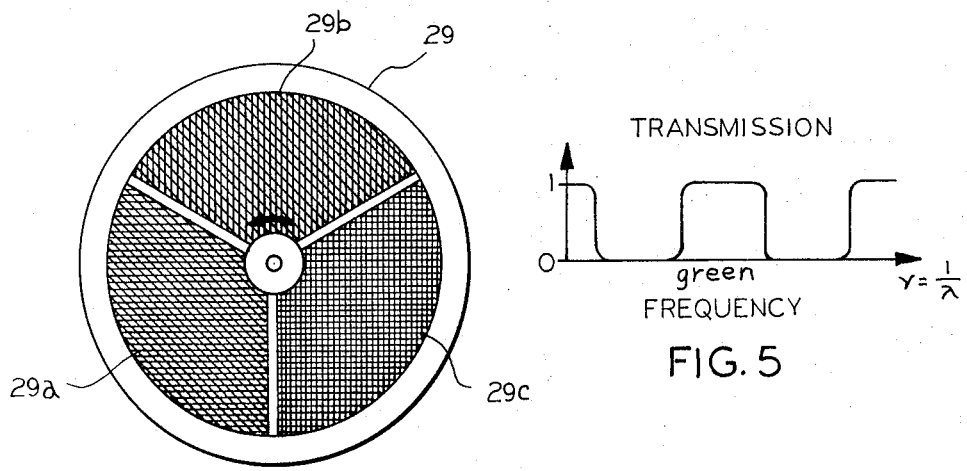
FIG. 4
FIG. 5
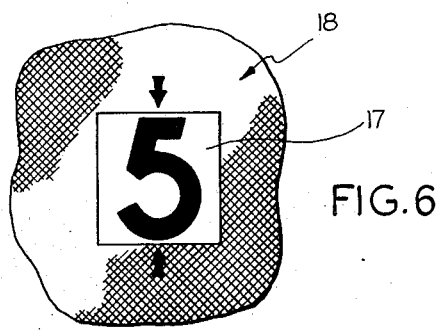
FIG. 6
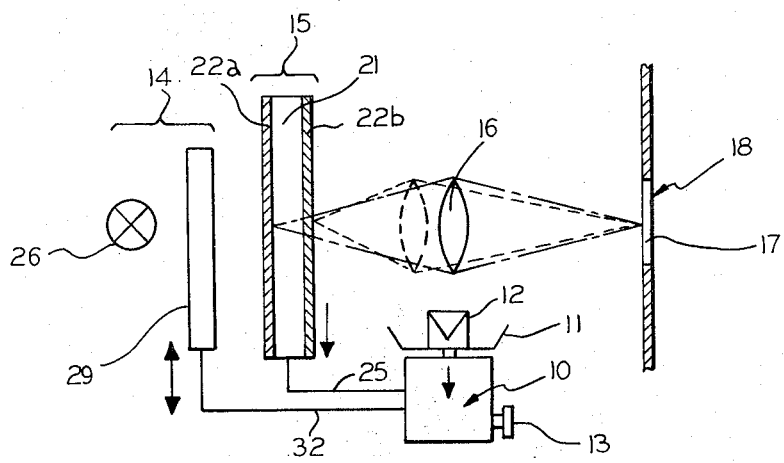
FIG. 12

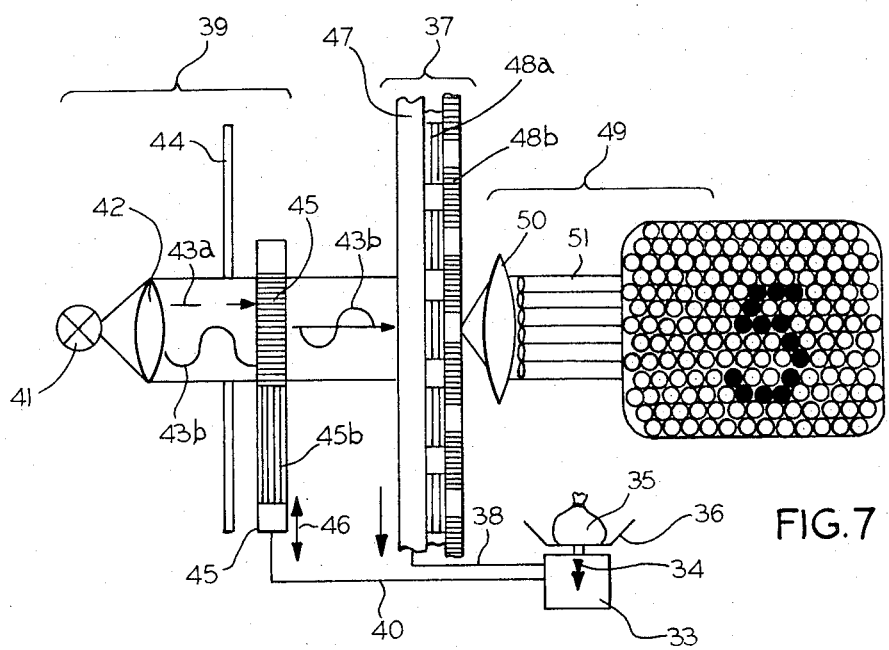
FIG. 7
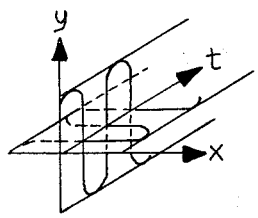
FIG. 8
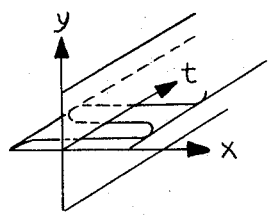
FIG. 10
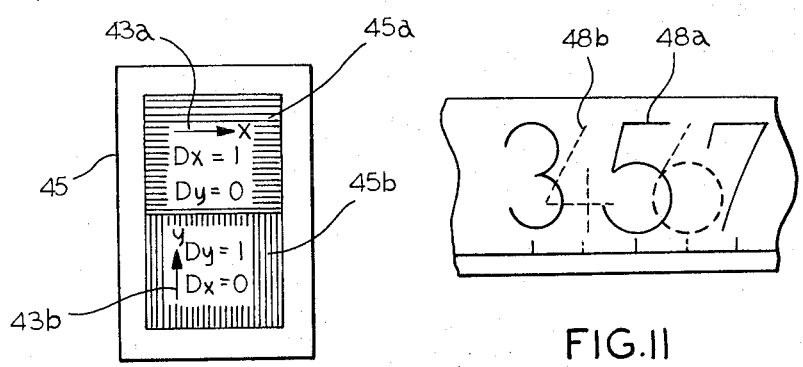
FIG. 9
FIG. 11

MEASURING INSTRUMENT WITH DATA OPTICAL PROJECTION SYSTEM

This invention relates in general to a measuring device having an optical projection system for projecting data to be read out in accordance with the magnitude of the measuring function, and more particularly to a weighing scale wherein the data projected indicates weight and/or pricing information of the merchandise being weighed.

It is known in connection with weighing scales to optically project the weight and selling price of merchandise being weighed where the price-per-unit weight is programmed into a computer that computes the selling price of the merchandise in response to the magnitude of its weight. The price-per-unit weight would be manually set for the weighing operation. Accordingly, the multiple indication of weight, price-per-unit weight and total selling price is preferably handled by an optical projection system. In such a scale, the optical projection system would include a light source illuminating a translucent movable data storage device usually in the form of a translucent plate bearing graduated values. The data storage device moves in relation to the magnitude of the goods being weighed wherein the light source causes the projection of the data in line with the projection axis of the light source onto a readout device, such as a frosted glass screen.

It is known that the usefulness of such a scale with an optical projection system is greater and more convenient in accordance with the number of individual graduated values in legend form which may be applied to the data storage device inasmuch as the more extensive the number of graduated values enables the use of finely graduated readings, thereby eliminating the difficulties of interpolation between values. Because of technical and practical reasons and because of cost considerations, the surface area of a translucent plate upon which values are applied is limited, thereby inherently limiting the number of individual graduated values for the translucent plate. Therefore, only so many of the graduated values as will fit on an available area of a data plate will be used. Moreover, the size of the legends representing the values is as small as possible considering the costs involved to produce satisfactory projectionable legends and mechanical considerations of the measuring instrument such as vibration which impairs the magnification possibilities of legends too small in size for projecting a clear image.

The present invention solves the problem of limiting the number of legend values applicable to the movable translucent scale or plate in providing means that permits the use of an extremely high number of graduated values, the size of which is sufficiently large to enable low-cost reproduction and satisfactory readout because of a relatively large optical image obtainable with a relatively simple and inexpensive lens system.

The application of a large number of legend values on a translucent plate is accomplished by the present invention utilizing materials on the movable data storage plate having light modulative properties differing from each other with different sets of data and a light transmitter adjustable to have complementary light modulative properties to select one of the sets of data for optical projection.

The light energy modulative materials on which the legend values or graduation lines are applied may be of absorbent materials responsive to different wave lengths or frequencies of light energy or of light energizing polarizing properties differing from each other. The light transmitter ahead of the data storage plate or carrier is adjustable to emit a light energy complementary to the light modulative properties of one of the properties on the scale carrier so that the legend values of any one of the materials will be visible and readable on the readout device. It can therefore be appreciated that the legend values of the other materials will not be readable and therefore will be invisible with respect to the readout device.

Because of the use of different light modulative materials for the data storage device, it is possible to place the legend values of differing materials in overlapping relation relative to the projection axis and light rays of the light transmitter, whereby each legend may then occupy a sufficiently large area on the carrier plate to facilitate projection to the readout device and to also enable a greater number of legend values to be placed on the scale carrier. It can then be appreciated that if an ordinary light source were utilized which is not light energy modulated, all of the legend values in the path of the projection axis would be projected to the readout device and because there would not normally be sufficient differences between the legends to distinguish one set of data from the other, the data could not be clearly read at the point of reading in the readout device. According to the present invention where the light transmitter is light energy modulated, only the correct selected legend values are visible at the readout device, thereby enhancing a clear reading of the data projected. It may therefore be appreciated the present invention permits the use of a number of legend values on a movable translucent scale plate substantially greater than heretofore thought possible without making the size of the legends extremely small, which is costly and which would necessitate a complex and costly magnifying lens system.

The light transmitter according to the invention with its light energy modulative adjustability for generating light energy of different characteristics can take various forms. For example, the transmitter may employ as a source of light energy an electrically operated lamp which by applying a variation of voltage thereto would radiate various wave lengths of light energy wherein the materials of the data storage carrier would respond to the various wave lengths of light energy for transmission of data information to the readout device. It would also be possible to employ in the light transmitter one or more prisms for selecting certain wave lengths of light energy. Other methods known may also be used, such as the recently developed lasers wherein spectral variation is accomplished by longitudinal changes of the laser beam. However, it is believed that one of the most practical and inexpensive light transmitter constructions would employ a light energy source emitting light energy of the entire visible spectrum and a series of filters that would filter out certain of the wave lengths of light energy and permit only a given spectral portion to be transmitted to the data storage device and the readout device. In this situation, the filter could be movable to provide a filter of a given type in the path of the light column of the light energy source wherein the filter would have a certain spectral response. Any sort of driving mechanism may be employed for operating the filter selection, and it will be appreciated that the light modulative materials of the filters would be complementary to the light modulative materials of the sets of data on the data storage device. For example, the filter may be permeable only to the green of the visible spectrum whereby it would not allow the red and blue frequency range to penetrate the filter. Accordingly, the set of data on the data storage device of the material allowing the permeability of green would be visible on the readout device, while the data of materials of the other colors would not be visible.

Similarly, when using polarizing materials in the light transmitter and the data storage device, the selection of the data to be projected to the readout device would be made at the light transmitter with the desired polarizing filter. It should also be appreciated that a selection filter device in the light transmitter may be made of a material having optical properties varied according to chemical or physical action, such as by pressure, traction or electrical tension.

The adjustment of the light transmitter to handle the desired legend values of a set of data on the data storage device may be accomplished manually. In the case of weighing scales, the light transmitter would be preset in accordance with the desired price-per-unit weight for the merchandise to be weighed, wherein the total selling price of the merchandise would be indicated at the readout device as a function of the weight of the goods. In the simplest illustration, the entire row of legend values pertaining to a given price-per-unit weight comprises a set of data consisting of materials responsive to the same light energy or light modulatively equal to each other so that following the presetting of the light transmitter, the transmitter maintains the same light modulation with the weighing operations. Accordingly, when the light transmitter includes movable selection filters, a certain filter is positioned in the projection axis of the light energy emitted from the light source and remains in that position during the entire weighing operation, while other sets of data of different materials would be arranged in adjacent rows for the immediate higher and/or lower price-per-unit weight. Thereafter, operation of the movable selection filters in the light transmitter effects the use of another price-per-unit weight set of data. The different rows of legend values representing different sets of data for predetermined price levels differing from each other can be offset only in a horizontal direction or also in a vertical direction to increase the density of the legends and the capacity of the data to be projected.

The light transmitter may also be adjusted to control its optical response as a function of the desired reading value of the measuring instrument, such as where weighing scales would have very finely graduated continuous weight legends. In this case, an interpolation of scale graduation lines could practically be eliminated since for almost any intermediate value the corresponding figure sequence is stored on the data scale carrier. Therefore, the adjustment of the light transmitter is controlled automatically by the reading size of the measuring apparatus and changes complementarily to the sequence in adjacent figure values on the scale carrier. Therefore, the measuring mechanism of the measuring instrument not only handles a movement true to the reading and size of the scale with regard to the light energy path but at the same time it also selects the properties of the light energy in the path. Accordingly, if the adjustment of the light transmitter is done by selectively movable filters, the filters will be synchronously driven through a drive connected to the drive of the measuring mechanism.

The density of the scale graduation lines or legend values on a surface area of the data storage carrier can also be increased by arranging these sets of values in spaced planes on the data carrier and by providing a variable optical projection system along the projection axis, the depth of focus of which is adjustable on the object side. This would permit the application of legend values on the front and rear sides of a glass substrate. The variable optical projection system would include a lens movable along the projection axis that may be connected to a drive mechanism for moving it to various positions to sharply focus the legend values on one of the sides of the glass substrate, while the legend values on the other side would be for all practical purposes invisible because of being out of focus.

It is therefore an object of the present invention to provide a new and improved measuring instrument and particularly a new and improved optical projection system for a measuring instrument wherein the number of characters or legends projectable is greatly increased.

Another object of this invention is in the provision of a measuring instrument such as a weighing scale having an optical projection system including a data storage device having overlapping sets of data of different light modulative materials and a light transmitter adjustable to produce a light energy source of complementary light modulative properties for selecting one of the sets of data for projection in the system.

Other objects, features and advantages of the invention will be apparent from the following detailed disclosure, taken in conjunction with the accompanying sheets of drawings, wherein like reference numerals refer to like parts, in which:

FIG. 1 is a schematic view of a measuring instrument having an optical projection system according to the invention in the form of a weighing scale;

FIG. 2 represents an expanded layout of the layer structure on the data scale carrier;

FIG. 3 shows diagrams for the different optical properties of the materials used in the layout of FIG. 2;

FIG. 4 is an elevational view of the selection filter of the light transmitter used in the embodiment of FIG. 1;

FIG. 5 is a diagram illustrating optical characteristics of an area of the filter shown in FIG. 4;

FIG. 6 shows an image created at the readout device of the instrument according to the embodiment of FIG. 1;

FIG. 7 is a schematic view of a measuring instrument according to another embodiment of the invention;

FIG. 8 is a perspective representation of the properties of the light source utilized in the light transmitter of the embodiment of FIG. 7;

FIG. 9 is an elevational view of the filter device utilized in the light transmitter of the embodiment of FIG. 7, illustrating two optically different areas;

FIG. 10 is a perspective representation of the light energy emitted from the filter in accordance with the filter position shown in FIG. 7;

FIG. 11 illustrates a presentation of legend values appearing on the data scale carrier of the embodiment of FIG. 7; and FIG. 12 is a schematic view of a measuring instrument according to a further embodiment of the invention Referring now to the drawings, and particularly to the embodiment of FIGS. 1 to 6, a measuring instrument is illustrated schematically in the form of a weighing scale for the weighing of goods. However, it should be appreciated that the present invention is concerned with an optical projection system for a measuring instrument, and such a system could be used with instruments other than weighing scales. The unique feature of the optical projection system according to the invention resides in the ability to store a large number of legend values in a data storage device to facilitate the direct readout of very small measurement quantities without the need of interpolation.

The measuring instrument in the form of a weighing scale is generally indicated by the numeral 10 in FIG. 1, and includes a weighing platform 11 onto which goods or merchandise 12 may be placed to be weighed. The sales price of the goods, being proportional to its weight, will depend upon the price-per-unit weight which can be selected and programmed into the weighing operation by manipulation of the price-per-unit weight selection knob 13.

The optical projection system associated with the weighing scale 10 includes generally a light transmitter or generator 14 for producing light energy of a preselected character, a data storage device 15 receiving the light energy of the light transmitter and having data information desired as a result of the weighing operations, an optical image system 16 receiving the light energy from the data storage device 15 and projecting it to a readout window 17 of a readout device 18. The optical image system 16 projects light energy in the form of rays 19 and data from the data storage device 15 along the projection axis 20 to the readout window 17 which may be in the form of a frosted glass screen or the like. The projection axis or optical axis 20, shown as a dot-dash line in FIG. 1, extends along the entire optical projection system from the light transmitter 14 to the readout device 18.

The data storage device 15 is in the form of a movable scale carrier and includes a carrier or substrate 21 of a material that will transmit all light energy or visible radiation of the entire visible spectrum. Data is applied to the carrier 21 in the form of a plurality of coatings of material 22, each of which represents a set of data such as that corresponding to a total sales price according to a price-per-unit weight of goods weighed on the scale 10. Accordingly, each set of data will be applied to the carrier of a material permeable to a given light energy. For the sake of simplicity and clarity, the coatings of material 22 include three different materials having adjacent scale graduation or legend values 22a, 22b and 22c, FIG. 2. While only single digit numbers are shown, it can be appreciated that multi-digit numbers may be provided, or letters and/or graduation marks may be provided as any of the sets of data. Therefore, three sets of data are illustrated in the embodiment of FIGS. 1 to 6 although it should be appreciated that any number may be provided. The data storage device 15 in the form of a data storage plate is movable along the direction of the arrow 23 in response to the weighing function of the scale and relative to the projection axis 20 of the optical projection system. As illustrated in FIG. 1, the data storage plate is movable along a plane perpendicular to the projection axis. The data storage plate is movable in direct proportion to the weight of the material 12 as illustrated by the arrow 24 through the connection line 25.

The coatings 22 of the legends are of optically different materials for the different sets of data 22a, 22b and 22c, as indicated by the hatching of the section of the measuring scale shown in the light energy path along the projection axis 20. Exemplary of the different types of material, that representative of the set of data 22a absorbs light in the red spectral range of the visible spectrum as indicated in FIG. 3. It will be understood that not only the numeral "4" of the material coating 22a, but also the numerals "1" and "7" are of the same material but located in spaced relation to the numeral "4." As shown in FIG. 2, only the figures that are hatched are in the path of the light energy being produced by the light transmitter 14, and for this reason the numerals "4," "5" and "6" are hatched. The optical properties of the material for the set of legend values 22b are different from those of the set of legend values 22a wherein the material absorbs in the green spectral energy range, as shown in FIG. 3. Similarly, the optical properties of the material for the set of data 22c is of a still different range wherein it absorbs the light energy in the blue frequency range, as shown in FIG. 3. As illustrated in FIG. 2, it is seen that the legends of different materials are in superposed or overlapping relationship, and it may be appreciated that the manner shown in FIG. 2 is for illustration, although the legend values may actually be in complete overlapping relation or where a numeral "5" is directly on top of the numeral "4" and the numeral "6" is directly on top of the numerals "5" and "4." The legend values may be applied to the substrate 21 in any suitable manner such as by photographic processes by the exposure and development of appropriate photo-sensitive layers. The formation of the legend values may also be accomplished by overlapping layers of material with the legends thereon, and for all practical purposes the legend values of different materials will be in the same plane on the carrier 21.

The light transmitter 14 includes a light source 26 emitting light energy of the entire visible spectrum which is directed through a condensing lens 27 to a partial section of the movable data storage plate 15, as illustrated by the hatching. The light column emitted from the condensing lens 27, for purposes of illustrating the invention, includes light energy having red wave lengths 28a, green wave lengths 28b and blue wave lengths 28c. The light energy distributed to the data plate 15 is controlled by a filter wheel 29 which includes a red filter segment 29a, a green filter segment 29b and a blue filter segment 29c, as shown in FIG. 4. The circular filter disk 29 is rotatably mounted on a shaft 30 to selectively bring any one of the filter segments into position to filter the light energy emitted from the light source. Accordingly, the sectors or segments of the filter 29 absorb in the different frequency ranges of the visible spectrum wherein the sector 29a only permits the transmission of red light energy, while it absorbs green and blue light energy. Similarly, filter segment 29b only permits the transmission of green light energy, while absorbing red and blue light energy, and the filter segment 29c permits the transmission of blue light energy, while absorbing red and green light energy. Accordingly, the light transmitter 14 is light modulative as is the data storage device 15 in a complementary fashion.

Where the measuring instrument is in the form of a weighing scale as illustrated, it may be assumed that the legend values on the data storage device represent total sales prices which correspond to price-per-unit weight levels as selected by the selection knob 13. As shown in FIG. 1, the sector 29b is in the path of the light energy along the projection axis 20, wherein the wave lengths of light energy 28a and 28c are absorbed in the filter sigment 29b and the light energy component 28b is transmitted as illustrated by the sign wave legend appearing between the filter 29 and the data storage device 15 to the data storage device. The green light energy 28b thereby radiates that part of the measuring scale on the data storage plate illustrated by the hatching which includes numerals "4," "5" and "6." Inasmuch as the material 22b can absorb the green light energy passed by the filter segment 29b, only the legend "5" formed on the material 22b appears at the readout device on a green background. At the same time, legend "4" of the material 22a and legend "6" of the material 22c, which will not absorb the green light energy, will not appear at the readout window 17 and will therefore in a sense be invisible.

it will be appreciated that the filter disk 29 can be rotated about its axis 30 according to the arrow 31 by operation of the selection knob 13 so that the sector 29a may be in the path of the light energy emitted from the light source to project the set of data 22a at the readout window or the filter segment 29c can be positioned in the path of the light energy to project the data of the material 22c at the readout window. With respect to the data of the material 22a, black numerals with a red background will appear at the readout window, while with respect to the data of the material 22c black numerals with a blue background will appear at the readout window. A connection line 32 is illustrated between the adjustment knob 13 and the filter disk 29, and it can be appreciated that electrical or mechanical drive connections may be employed. It should further be appreciated that the section of the data readout plate located in the path of the light energy projection axis 20 is a function of the weight of the goods 12 on the scale platform 11.

The embodiment of FIGS. 7 to 11 differs from the embodiment of FIGS. 1 to 6 essentially in that modulation of the light energy is accomplished by polarization rather than by absorption. A weighing scale 33 is illustrated here as the measuring instrument pursuant to a weight represented by the arrow 34 of the goods 35 received on the weighing platform 36 of the scale. Weight information is transmitted to the data storage device 37 through a suitable connection line 38. A light transmitter 39 is adjusted through suitable controls on the scale by way of a connection line 40.

The light transmitter includes a source of light energy 41 which produces unpolarized light energy, as represented in FIG. 8, along oscillation planes $x$ and $y$ relative a time scale $t$ extending perpendicular to the axes of the oscillation planes. The oscillation planes are also represented as emanating through a condensing lens 42 in the from of components 43a and 43b. The $x$ component is represented as 43a and the $y$ component is represented as 43b. The components are shown in relation to a diaphragm 44 arranged behind the condensing lens 42.

In order to filter out one of the components, a filter plate 45 having filter segments 45a and 45b is arranged behind the diaphragm and ahead of the data storage device 37. The filter plate 45 is movable as indicated by the arrow 46 to position either the filter segment 45a or the filter segment 45b in the light energy path produced from the light source. The optical properties of the filter segments 45a and 45b differ, as illustrated by hatching wherein the filter segment 45a allows the transmission of the component in the $x$ plane, while the filter segment 45b allows transmission of the component in the $y$ plane, as illustrated in FIG. 9. More specifically, light energy oscillating in the wide plane is passed through the filter segment 45b, as shown in FIG. 9, by $D_y = 1$, while the component oscillating in the $x$ plane is not permitted to pass, as shown by $D_x = 0$. The opposite effect is accomplished by the filter segment 45a where only passage of the horizontal component is permitted.

The data storage device 37 includes a carrier 47 which transmits both the $x$ and $y$ plane components of the light energy and layers of material 48a and 48b having different optical properties. The layer 48a allows the transmission of the horizontal component in the $x$ plane, while the layer 48b allows the transmission of the vertical component in the $y$ plane. The representation in FIG. 10 coincides with the condition of optical transmission in FIG. 7 wherein the filter segment 45a is positioned in the path of light energy to cause transmission of the data on the layer 48a as represented by the solid line numerals "3," "5" and "7" shown in FIG. 11. Accordingly, the layers of material 48a and 48b are respectively of the same optically different materials defining the filter segments 45a and 45b of the filter 45. Again, it is appreciated that the legend values, as illustrated in FIG. 11, can overlap and wherein the values "3," "5" and "7" are of the material making up the layer 48a, while the values "4" and "6" are of the material making up the layer 48b. One section of the data plate 37 is illuminated depending upon the weight 34 measured by the scale 33. The values represented by dots in FIG. 11 allow transmission of the light energy 43 oscillating in the $x$ plane to pass unattenuated or invisibly, while the material of the values in solid absorbs this light component so that the numeral appears black on a white color background. As seen particularly in FIG. 7, the numeral "5" is illustrated in enlarged form by an optical imaging system 49 which includes a lens 50 and a fiber-optic bundle 51. As seen in FIG. 7, at the right-hand end thereof, the fiber-optic bundle ends are angled so that the numeral "5" from the layer 48a can be seen.

It will be appreciated that the layers 48a and 48b are extremely thin and thereby practically in the same plane on the carrier 47, although for purposes of clarity the thickness of the layers and carrier are shown in exaggerated form.

Should the filter plate 45 be shifted to its other position where the filter segment 45b is positioned in the light energy path, the light component in the $y$ plane will be emitted from the light transmitter 39. Then the legend values of the layer 48b will extinguish the light energy component to be projected through the optical imaging system whereby the legend values of the material layer 48a will remain essentially invisible.

While only two types of material are illustrated as being used in the embodiment of FIGS. 7 to 11, it should be appreciated that any number of types of material may be utilized to increase the density of the legend values. Moreover, light modulation by frequency absorption, as shown in FIGS. 1 to 6, could be employed simultaneously with light energy modulation by polarization, as shown in FIGS. 7 to 11, thereby permitting an even larger number of layers of mateial to further increase the number of legend values that can be used on the data storage device and thereby the fineness of resolution of the graduated scale. Further, the width of the absorption as dictated by the range of wave length energy to be absorbed can be much narrower than that illustrated in the embodiment of FIGS. 1 to 6, thereby permitting a greater number of sets of data for the data storage device. It should further be recognized that the background color in the case of light energy modulation by the method of FIGS. 1 to 6 will provide information regarding the measuring range in which the measuring operation is being conducted.

A further embodiment of the invention is illustrated in FIG. 12, and like reference numerals are employed for like parts shown in the embodiment of FIG. 1. This embodiment differs in that the data storage device, while including a transparent carrier 21, mounts the layers of legend values 22a and 22b on opposite sides of the carrier, thereby distinctly separating them along the projection axis of the optical projection system. Additionally, the optical image system in the form of a lens 16 is adjustable between the position shown in solid lines and that shown in dotted lines to respectively focus sharply the legend values of the layer 22a or the layer 22b onto the readout window 17 of the readout device 18. Accordingly, twice the capacity of legend values over the embodiment of FIG. 1 or the embodiment of FIG. 7 can be achieved, it being appreciated that the systems of the other embodiments can also be combined with this embodiment. The legend value capacity of the data storage device can still be further increased by providing more than two planes of data, each of which would have several sheets of data, and wherein the light transmitter would be adjusted as well as the optical system.

It will be understood that modifications and variations may be effected without departing from the scope of the novel concepts of the present invention, but it is understood that this application is to be limited only by the scope of the appended claims.

The invention is hereby claimed as follows:

1. A measuring instrument including an optical projection system for projecting data in response to a measuring function comprising:
    a data storage device having a light energy transmitting transparent substrate movable in response to the magnitude of the measuring function, a plurality of sets of data on said substrate and each set of data being of a different light energy responsive material;
    a readout device on one side of the data storage device;
    and a light energy transmitting device on the other side of said data storage device including a source of light energy projecting light energy along a projection axis through said data storage device to said readout device and movable light energy filter means having a plurality of different light energy responsive materials complementary to the materials of said sets of data;
    whereby only the set of data of the material complementary to that of the filter means aligned with the projection axis will be visible at the readout device.

2. A measuring instrument as defined in claim 1, wherein said sets of data are arranged in overlapping relation and substantially in the same plane.

3. A measuring instrument as defined in claim 1, wherein said instrument includes a weighing scale having a weighing platform on which articles to be weighed are positioned, and means connecting the platform to said data storage device.

4. A measuring instrument as defined in claim 3, wherein said scale includes means for controlling the movement of said light energy filter means to select the set of data to be transmitted to the readout device.

5. A measuring instrument as defined in claim 1, wherein said light energy responsive materials of said sets of data and said filter means transmit given wave lengths of light energy.

6. A measuring instrument as defined in claim 1, wherein said light energy responsive materials of said sets of data and said filter means transmit given polarized light energy.

7. A measuring instrument including an optical projection system for projecting data in response to a measuring function comprising:
    a data storage device having a light energy transmitting transparent substrate movable in response to the magnitude of the measuring function, and a plurality of sets of data on said substrate;
    a readout device on one side of the data storage device;
    a light energy transmitting device on the other side of said data storage device including a source of light energy projecting light energy along a projection axis through said data storage device to said readout device;
    and means for causing only one set of data to be visible on said readout device.

8. A measuring instrument as defined in claim 7, wherein said means includes each set of data being of a different light energy responsive material, and said transmitting device including a movable light energy filter means having a plurality of light energy responsive materials complementary to the materials of said sets of data,
    whereby only the set of data of the material complementary to that of the filter means aligned with the projection axis will be visible at the readout device.

9. A measuring instrument as defined in claim 8, wherein said sets of data are arranged in overlapping relation and substantially in the same plane.

10. A measuring instrument as defined in claim 9, wherein said light energy responsive materials of said sets of data and said filter means transmit given wave lengths of light energy.

11. A measuring instrument as defined in claim 9, wherein said light energy responsive materials of said sets of data and said filter means transmit given polarized light energy.

12. A measuring instrument as defined in claim 9, wherein said light energy responsive materials of said sets of data and said filter means are light energy absorbent.

13. A measuring instrument as defined in claim 9, wherein said light energy responsive materials of said sets of data and said filter means are light energy polarizing.

14. A measuring instrument as defined in claim 7, wherein said sets of data are arranged in overlapping relation, and said means includes said sets of data being arranged in parallel spaced planes and an optical imaging lens movably mounted along the projection axis between said data storage device and said readout device to selectively sharply focus one of said sets of data on the readout device.

15. A measuring instrument as defined in claim 14, wherein said instrument includes a weighing scale having a weighing platform on which articles to be weighed are positioned, and means connecting the platform to said data storage device.

16. A measuring instrument as defined in claim 15, wherein said scale includes means for controlling movement of said optical imaging lens to select the set of data to be sharply focused on the readout device.

17. In a weighing scale, an optical projection system for projecting data to a readout device as a function of the weighing operation, said system comprising:
a data storage device having a carrier of a material which will transmit both polarized and unpolarized light energy of the entire visible spectrum movable in response to the weighing operation, a plurality of sets of data on said carrier of materials having different light energy transmission characteristics;
a readout device on one side of the data storage device;
an image lens between the storage device and the readout device;
a light energy transmitting device on the other side of said data storage device including a source of light energy projecting light energy along a projection axis through said data storage device to said readout device;
and means for selecting one set of data on said carrier to be visibly projected to said readout device.

18. The combination as defined in claim 17, wherein said means includes spacing the sets of data in a plurality of planes along the projection axis and movably mounting said image lens to focus one of said planes for sharp projection to the readout device.

19. The combination as defined in claim 18, wherein said means includes complementary light modulation means on said carrier and said light transmitter to select one set of data for projection.

* * * * *